United States Patent
Gabor et al.

(10) Patent No.: US 9,858,140 B2
(45) Date of Patent: Jan. 2, 2018

(54) MEMORY CORRUPTION DETECTION

(71) Applicant: Intel Corporation, Santa Clara, CA (US)

(72) Inventors: Ron Gabor, Hertzliya (IL); Raanan Sade, Kibutz Gvat (IL); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/531,498

(22) Filed: Nov. 3, 2014

(65) Prior Publication Data

US 2016/0124802 A1    May 5, 2016

(51) Int. Cl.
*G06F 11/10* (2006.01)

(52) U.S. Cl.
CPC .................... *G06F 11/10* (2013.01)

(58) Field of Classification Search
CPC  G06F 11/1004; H03M 13/6566; H03M 13/09
See application file for complete search history.

(56) References Cited

U.S. PATENT DOCUMENTS

| | | | |
|---|---|---|---|
| 7,930,491 B1 | 4/2011 | Xu et al. | |
| 8,510,596 B1 | 8/2013 | Gupta et al. | |
| 9,619,313 B2 | 4/2017 | Stark et al. | |
| 9,652,375 B2 | 5/2017 | Stark et al. | |
| 2007/0055837 A1 | 3/2007 | Rajagopal et al. | |
| 2007/0136385 A1 | 6/2007 | Abrashkevich et al. | |
| 2008/0320336 A1 | 12/2008 | Qadir et al. | |
| 2009/0249289 A1 | 10/2009 | Akritidis et al. | |
| 2010/0162038 A1 | 6/2010 | Hulbert et al. | |
| 2011/0145536 A1 | 6/2011 | Zachmann | |
| 2011/0145632 A1 | 6/2011 | Waldspurger et al. | |
| 2011/0173399 A1* | 7/2011 | Chen ..................... | G06F 11/348 711/154 |
| 2012/0131257 A1* | 5/2012 | Rudosky ............. | G06F 15/7867 711/5 |
| 2012/0137167 A1 | 5/2012 | Leischner et al. | |
| 2013/0013843 A1 | 1/2013 | Radovic et al. | |
| 2013/0024631 A1 | 1/2013 | Balasubramanian | |
| 2013/0036332 A1 | 2/2013 | Gove et al. | |

(Continued)

FOREIGN PATENT DOCUMENTS

EP    0652515 a1    5/1995

OTHER PUBLICATIONS

International Search Report and Written Opinion for International Patent Application No. PCT/US2016/014180, dated Jul. 11, 2016, 15 pages.
Office Action for Taiwan Patent Application No. 105105126, 21 pages, dated Oct. 31, 2016.
Stark, Tomer et al., "Heap Management for Memory Corruption Detection", U.S. Appl. No. 14/635,896, filed Mar. 2, 2015.

(Continued)

*Primary Examiner* — Guy Lamarre
(74) *Attorney, Agent, or Firm* — Lowenstein Sandler LLP

(57) ABSTRACT

Systems and methods for memory corruption detection. An example processing system comprises a processing core including a register to store a base address of a memory corruption detection (MCD) table. The processing core is configured to validate a pointer referenced by a memory access instruction, by comparing a first value derived from a first portion of the pointer to a second value stored in the MCD table at an offset referenced by a second portion of the pointer.

16 Claims, 11 Drawing Sheets

(56) References Cited

U.S. PATENT DOCUMENTS

| | | | |
|---|---|---|---|
| 2013/0097356 A1* | 4/2013 | Dang | G06F 9/455 |
| | | | 711/6 |
| 2013/0173954 A1 | 7/2013 | Woo et al. | |
| 2013/0283105 A1 | 10/2013 | Balasubramanian | |
| 2013/0318322 A1 | 11/2013 | Shetty et al. | |
| 2013/0318405 A1 | 11/2013 | Korah et al. | |
| 2014/0115283 A1 | 4/2014 | Radovic et al. | |
| 2014/0122826 A1 | 5/2014 | Jacob et al. | |
| 2014/0173356 A1 | 6/2014 | Burghard et al. | |
| 2014/0281336 A1 | 9/2014 | Solihin | |
| 2015/0106588 A1* | 4/2015 | Godard | G06F 12/0893 |
| | | | 711/221 |
| 2015/0127972 A1 | 5/2015 | Chun et al. | |
| 2015/0278103 A1 | 10/2015 | Radovic et al. | |
| 2016/0259682 A1 | 9/2016 | Stark et al. | |
| 2016/0283300 A1 | 9/2016 | Stark et al. | |
| 2016/0371139 A1 | 12/2016 | Stark et al. | |
| 2016/0371179 A1 | 12/2016 | Stark et al. | |
| 2017/0185535 A1 | 6/2017 | Stark et al. | |

OTHER PUBLICATIONS

Stark, Tomer et al., "Byte Level Granularity Buffer Overflow Detection for Memory Corruption Detection Architectures", U.S. Appl. No. 14/668,862, filed Mar. 25, 2015.

Stark, Tomer et al., "Byte Level Granularity Buffer Overflow Detection for Memory Corruption Detection Architectures", Taiwan Patent Application No. TW 105105126, filed Feb. 22, 2016.

Stark, Tomer et al., "Byte Level Granularity Buffer Overflow Detection for Memory Corruption Detection Architectures", PCT Patent Application No. PCT/US2016/014180, filed Jan. 20, 2016.

Stark, Tomer et al., "Memory Write Protection for Memory Corruption Detection Architectures", U.S. Appl. No. 14/745,172, filed Jun. 19, 2015.

Stark, Tomer et al., "Memory Write Protection for Memory Corruption Detection Architectures", U.S. Appl. No. 15/460,977, filed Mar. 16, 2016.

Stark, Tomer et al., "Multiple Chunk Support for Memory Corruption Detection Architectures", U.S. Appl. No. 14/746,702, filed Jun. 22, 2015.

* cited by examiner

Pointer Structure 415

| Bit position | 63 | 62         57 | 56                     0 |
|---|---|---|---|
| | =56 | MCD XOR 6{ptr[56]} | Linear Address |

*FIG. 4*

MEMORY CORRUPTION DETECTION

TECHNICAL FIELD

The present disclosure is generally related to computer systems, and is specifically related to systems and methods for memory corruption detection.

BACKGROUND

Memory corruption may be caused, for example, by an out-of-bound access (e.g., memory access using the base address of a memory buffer and an offset that exceeds the allocated size of the buffer) or by a dangling pointer (i.e., a pointer which referenced a memory buffer that has been de-allocated).

BRIEF DESCRIPTION OF THE DRAWINGS

The present disclosure is illustrated by way of examples, and not by way of limitation, and may be more fully understood with references to the following detailed description when considered in connection with the figures, in which:

FIG. 4 schematically illustrates an example pointer structure that may be employed by a method for memory corruption detection, in accordance with one or more aspects of the present disclosure;

DETAILED DESCRIPTION

Figure 1:
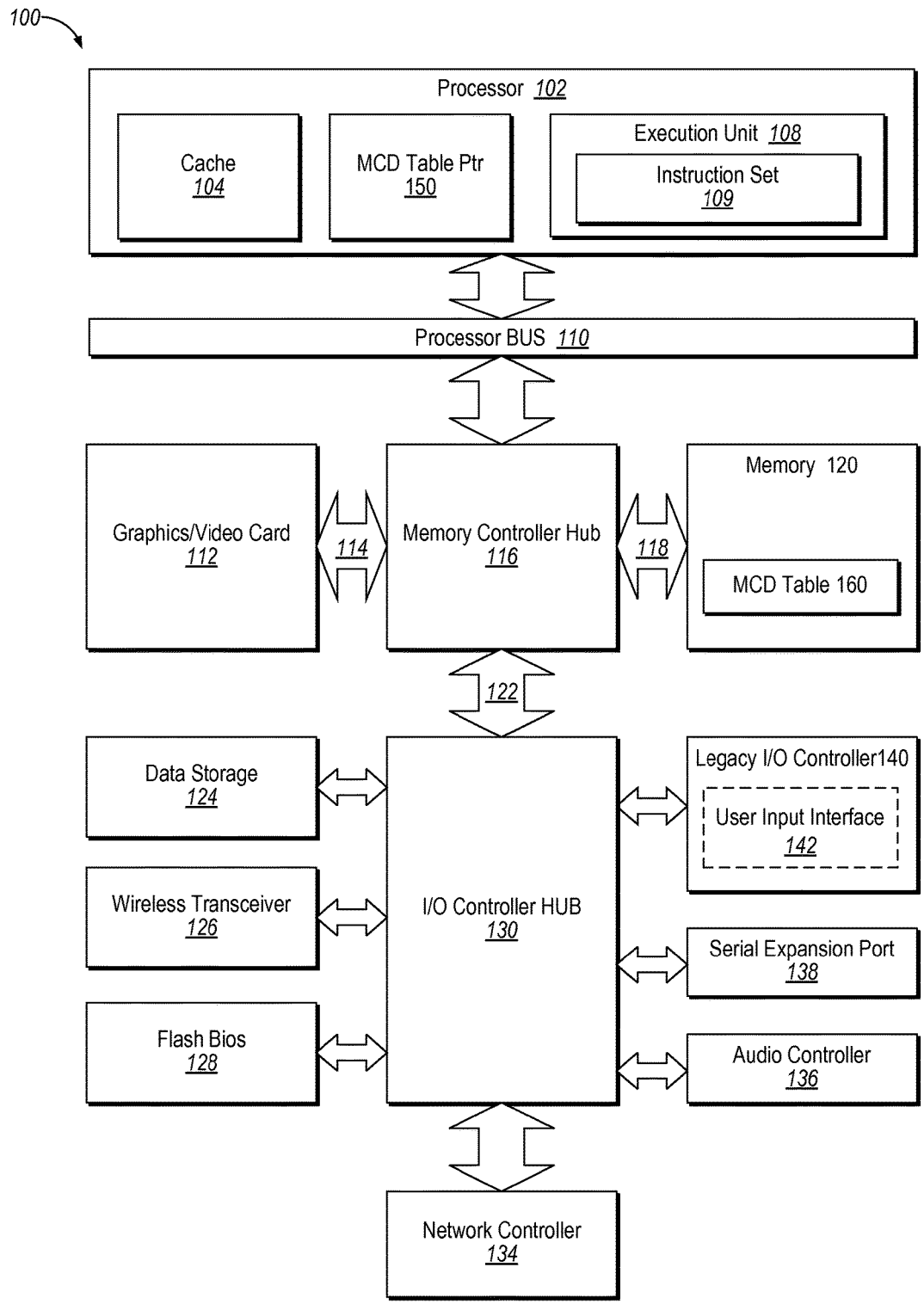
FIG. 1 depicts a high-level component diagram of an example processing system, in accordance with one or more aspects of the present disclosure.

Described herein are processing systems and related methods for memory corruption detection.

Memory corruption may be caused, for example, by an out-of-bound access (e.g., memory access using the base address of a memory buffer and an offset that exceeds the allocated size of the buffer) or by a dangling pointer (i.e., a pointer which referenced a memory buffer that has been de-allocated).

To prevent incidents of the above described and other possible memory corruption scenarios, a processing system may be configured to validate pointers produced by memory access instructions of the applications being executed by the processing system. In certain implementations, a processing system may maintain a metadata table that store an identifier for each memory block of a plurality of memory blocks of a pre-defined size (e.g., 64 bytes, although the scope of this disclosure is not limited to any particular memory block size). When a memory is allocated to a newly created memory object, a unique identifier may be generated and associated with one or more memory blocks that are comprised by the newly created memory object. The generated identifier may be stored in one or more metadata table entries that correspond to the memory blocks being allocated to the newly created memory object. The generated identifier, or a value derived from it using a certain method, may also be stored in one or more bits (e.g., upper bits) of a pointer that is returned by the memory allocation routine to the application that has requested the memory allocation. Responsive to receiving a memory access instruction, the processing system may compare a metadata value retrieved from the metadata table to a metadata value extracted from the pointer specified by the memory access instruction. Should the two metadata values mismatch, a page fault may be generated.

Various aspects of the above referenced methods and systems are described in more details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed.

The examples illustrating the present disclosure and accompanied drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

Referring now to FIG. 1, shown is a block diagram of an example processing system 100 in accordance with one or more aspects of the present disclosure. As shown in FIG. 1, processing system 100 may include one or more processors 102 to employ execution units including logic to perform one or more methods described herein.

In an illustrative example, processor 102 includes one or more execution units 108 configured to perform instructions of a certain instruction set. Processor 102 is coupled to a processor bus 110 that transmits data signals between processor 102 and other components in the system 100. Other elements of system 100 (e.g. graphics accelerator 112, memory controller hub 116, memory 120, I/O controller hub 124, wireless transceiver 126, flash BIOS 128, network controller 134, audio controller 136, serial expansion port 138, I/O controller 140, etc.) may perform their conventional functions that are well known to those familiar with the art.

Each processor 102 may comprise a plurality of registers, including general purpose registers and specialized registers. In certain implementations, processing system 100 may also include various other components not shown in FIG. 1. More detailed description of various components of processing system 100 is presented herein below.

Software applications being executed by processing system 100 may reference memory location using virtual addresses (e.g., represented by linear addresses in the linear address space). In accordance with one or more aspects of the present disclosure, processing system 100 may, before translating the referenced linear address to a physical address, validate the pointer specified by the memory access instruction, as described in more details herein below.

In certain implementations, processing system 100 may maintain a software-managed metadata table (hereinafter referred to as "MCD table"). MCD table 160 may reside in memory 120 and may be employed to store an identifier for each memory block of a plurality of memory blocks of a pre-defined size (e.g., 64 bytes, although the scope of this disclosure is not limited to any particular memory block size).

Referring again to FIG. 1, each processor 102 may comprise a register 150 (hereinafter referred to as "MCD table pointer") to store the base address of MCD table 160. The contents of MCD table pointer 150 may be saved/restored as part of the thread context by executing XSAVE/XRSTOR instructions.

Figure 2:
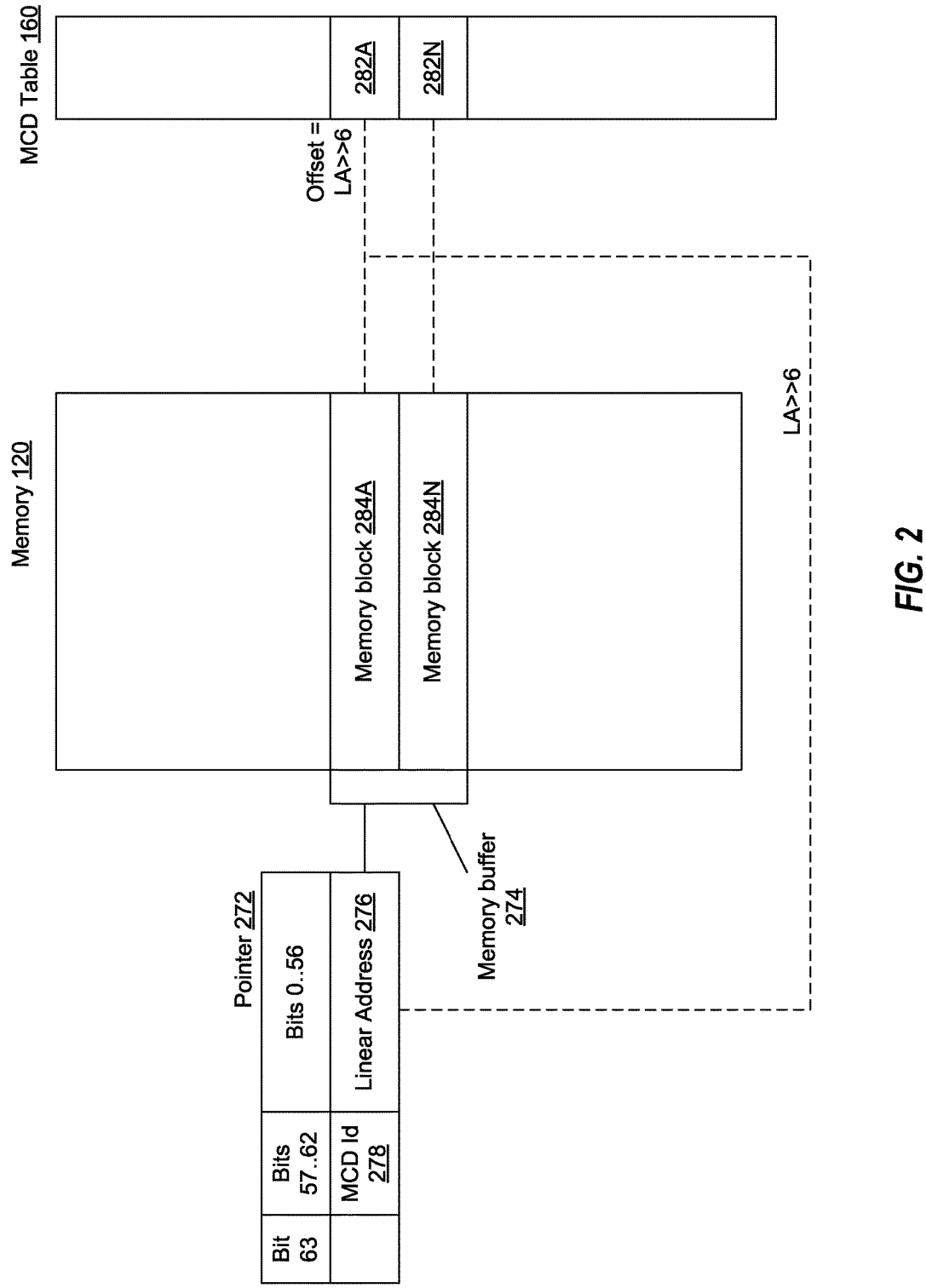
FIG. 2 schematically illustrates performing memory corruption detection by comparing a metadata value retrieved from the metadata table to a metadata value extracted from the pointer specified by a memory access instruction, in accordance with one or more aspects of the present disclosure.

FIG. 2 schematically illustrates performing memory corruption detection by comparing a metadata value retrieved from the metadata table to a metadata value extracted from the pointer specified by a memory access instruction, in accordance with one or more aspects of the present disclosure. When a memory is allocated to a newly created memory object (e.g., by calloc, malloc, or realloc routine), the memory allocation routine may generate an identifier to be associated with one or more memory blocks that are comprised by the newly created memory object. The generated identifier may be stored in one or more metadata table entries that correspond to the memory blocks being allocated to the newly created memory object. The generated identifier, or a value derived from it using a certain method, may also be stored in one or more bits (e.g., upper bits) of a pointer that is returned by the memory allocation routine to the application that has requested the memory allocation. These metadata bits will be used for MCD comparison to the corresponding metadata table entry (as described in more details herein below), and will be ignored for the purpose of the memory addressing (the actual memory load or store).

As schematically illustrated by FIG. 2, a pointer 272 may comprise an MCD identifier 278 and a linear memory address 276 referencing a memory object 274. Each of memory blocks 284A-284N that are comprised by memory object 274 may have a respective MCD identifier 282A-282N stored in MCD table 160 at the offset derived from the base addresses of the corresponding memory block 284, as described in more details herein below. As the size of memory block 284 is an implementation-specific value, each memory object 274 may comprise one or more memory blocks 284.

Responsive to receiving a memory access instruction, processing system 100 may extract an MCD identifier from the upper bits of the pointer specified by the memory access instruction, as described in more details herein below. Processing system 100 may then retrieve an MCD identifier stored in MCD table 160 at the offset derived from the linear addresses comprised by the pointer specified by the memory access instruction. Should the two MCD identifiers mismatch, a fault may be generated.

In the illustrative examples described herein, the granularity of MCD identifier assignment (i.e., the size of memory block 284) may be 64 bytes. The size of the MCD identifier may be 6 bits. MCD table offsets may be provided by near addresses, hence the MCD identifier corresponding to linear address X may be located within the MCD table byte at MCD_Table[X/64]=MCD_Table[X>>6], wherein MCD_Table is the base address of MCD table 160 (stored by MCD table pointer 150) and X>>6 designates the result of bitwise shifting the value of X by 6 positions to the right.

While the illustrative examples described herein assume the above referenced memory block size and MCD identifier size, the scope of the present disclosure is not limited to these values. In various other implementations, other values of memory block size and/or MCD identifier size may be employed.

While the illustrative examples described herein assume the above described indexing scheme for MCD table 160, the scope of the present disclosure is not limited to such an indexing scheme. In various other implementations, other indexing schemes (e.g., a multi-level indexing scheme) may be employed for MCD table 160.

On application startup, the application (or a runtime library) may, in addition to requesting a memory to be allocated for the heap, further request a memory to be allocated for the MCD table. In certain implementations, the memory allocation request for the MCD table may only reserve an address range in the linear address space, while not requiring the physical memory allocation to back the address range reservation. The operating system may use the zero page to back the MCD table, so that any load from the table would return 0, and a physical memory frame may be assigned on a first store operation performed with respect to a location in the MCD table.

Figure 3:
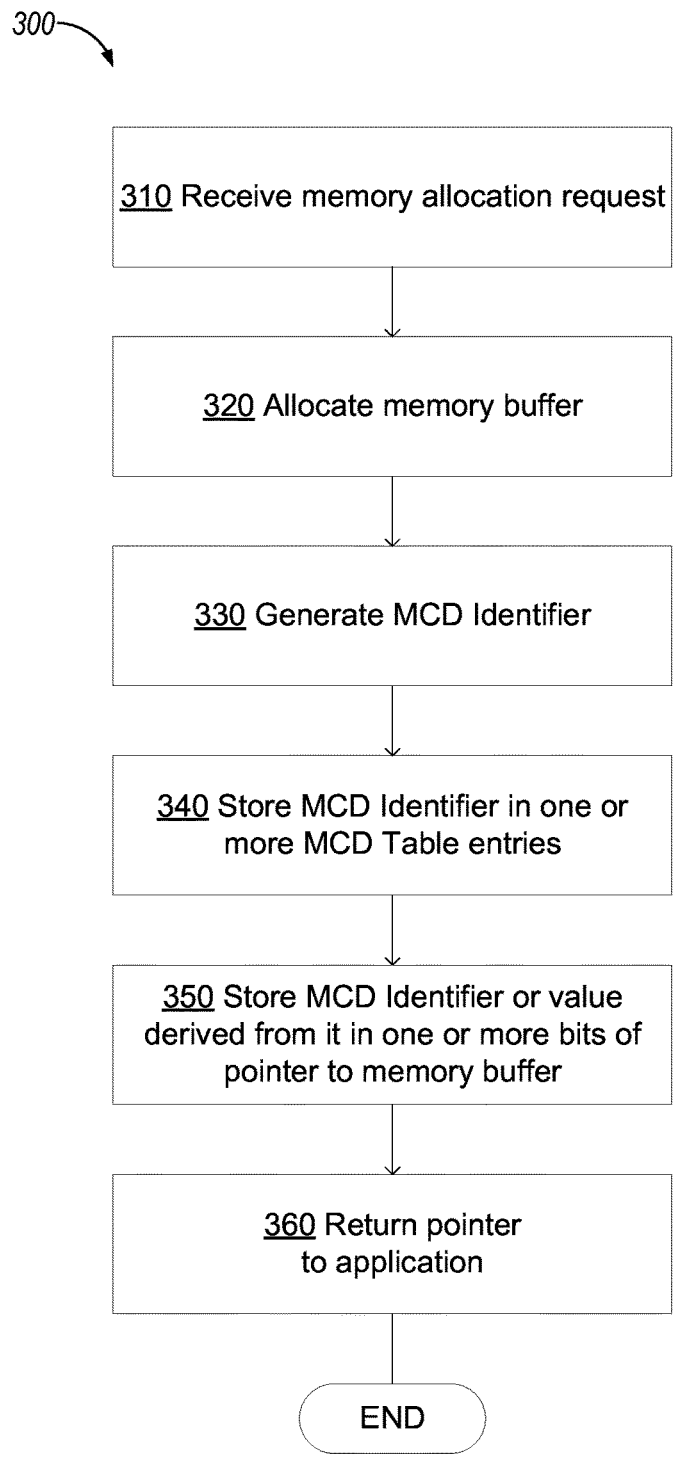
FIG. 3 depicts a flow diagram of an example method for memory allocation, in accordance with one or more aspects of the present disclosure.

FIG. 3 depicts a flow diagram of an example method for memory allocation, in accordance with one or more aspects of the present disclosure. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its functions, routines, subroutines, or operations may be performed by one or more physical processors of the computer system executing the method. Two or more functions, routines, subroutines, or operations of method 300 may be performed in parallel or in an order which may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In one example, as illustrated by FIG. 3, method 300 may be performed by the processing systems described herein below and illustrated by FIGS. 5-11.

Responsive to receiving, at block 310, a memory allocation request, the processing device implementing a memory allocation routine (e.g., calloc, malloc, or realloc routine) may, at block 320, allocate a memory buffer of the requested size, rounded up to the nearest multiple of the granularity of the MCD identifier assignment (e.g., 64 bytes), from the application heap.

At block 330, the processing device may generate the MCD identifier value to be associated with one or more memory blocks of a pre-defined size (e.g., 64 bytes) comprised by the memory buffer being allocated (e.g., by randomly generating a value or incrementing a static variable value).

At block 340, the processing device may store the generated MCD identifier value in the MCD table at the offsets corresponding to each memory block of one or more memory blocks of the pre-defined size (e.g., 64 bytes) comprised by the memory buffer being allocated. In an illustrative example the MCD identifier corresponding to linear address X may be located within the MCD table byte at MCD_Table[X/64], wherein MCD_Table is the base address of the MCD table.

At block 350, the processing device may store the generated MCD identifier, or a value derived from it using a certain method, in one or more bits (e.g., upper bits) of a pointer to the memory buffer being allocated. In certain implementations, the processing device may employ the exclusive disjunction (XOR) operation for storing the MCD identifier in the upper bits of the pointer.

FIG. 4 schematically illustrates an example pointer structure 415 that may be employed by a method of memory corruption detection, implemented in accordance with one or more aspects of the present disclosure. In the illustrative example of FIG. 4, the linear address space may employ 57-bit addresses. Thus, for a canonical pointer, bits 57 . . . 63 are all copies of bit 56.

When memory corruption detection is enabled, the MCD identifier value may be XOR'ed into the upper bits of the pointer, so that MCD identifier=ptr[62:57]=XOR 6{ptr[56]},
wherein ptr[62:57] denotes bits 57 . . . 62 of the pointer to the memory buffer being allocated,
6{ptr[56]} denotes 6 bits having the value of bit 56 of the pointer, and
XOR denotes the logical operation of exclusive disjunction.

Hence, pointer structure 415 of FIG. 4 may comprise the following portions:
bits 0 . . . 56 containing the linear address of the memory buffer being allocated;

bits 57 . . . 62 comprising a value derived from the MCD identifier assigned to the memory buffer being allocated; and bit 63 being a copy of bit 56.

While in the illustrative example of FIG. 4, the value stored in bits 57 . . . 62 may be determined as the result produced by applying the exclusive disjunction operation to the MCD identifier assigned to the memory buffer being allocated and 6 bits having the value of bit 56 of the pointer, the scope of the present disclosure is not limited to this example. In various other implementations, other methods of associating the MCD identifier value with the pointer referencing the memory buffer being allocated may be employed for implementing the systems and methods described herein.

While the illustrative examples described herein assume the 57-bit linear address space, the scope of the present disclosure is not limited to this address size. In various other implementations, other address sizes may be employed for implementing the systems and methods described herein. Also, other designations of the pointer bits as bits denoting address and bits denoting metadata may be employed.

Referring again to FIG. 3, at block 360, the processing device may return to the application a pointer to the allocated memory buffer, and the method may terminate.

In various illustrative examples, implementing the above described method of memory allocation with MCD support would only require modifications to the memory allocation routine, while not requiring any modifications to the compiler and the application. Validating the pointers produced by memory access instructions of an application may be implemented by processing system 100, as described in more details herein below with reference to FIG. 5.

Figure 5:
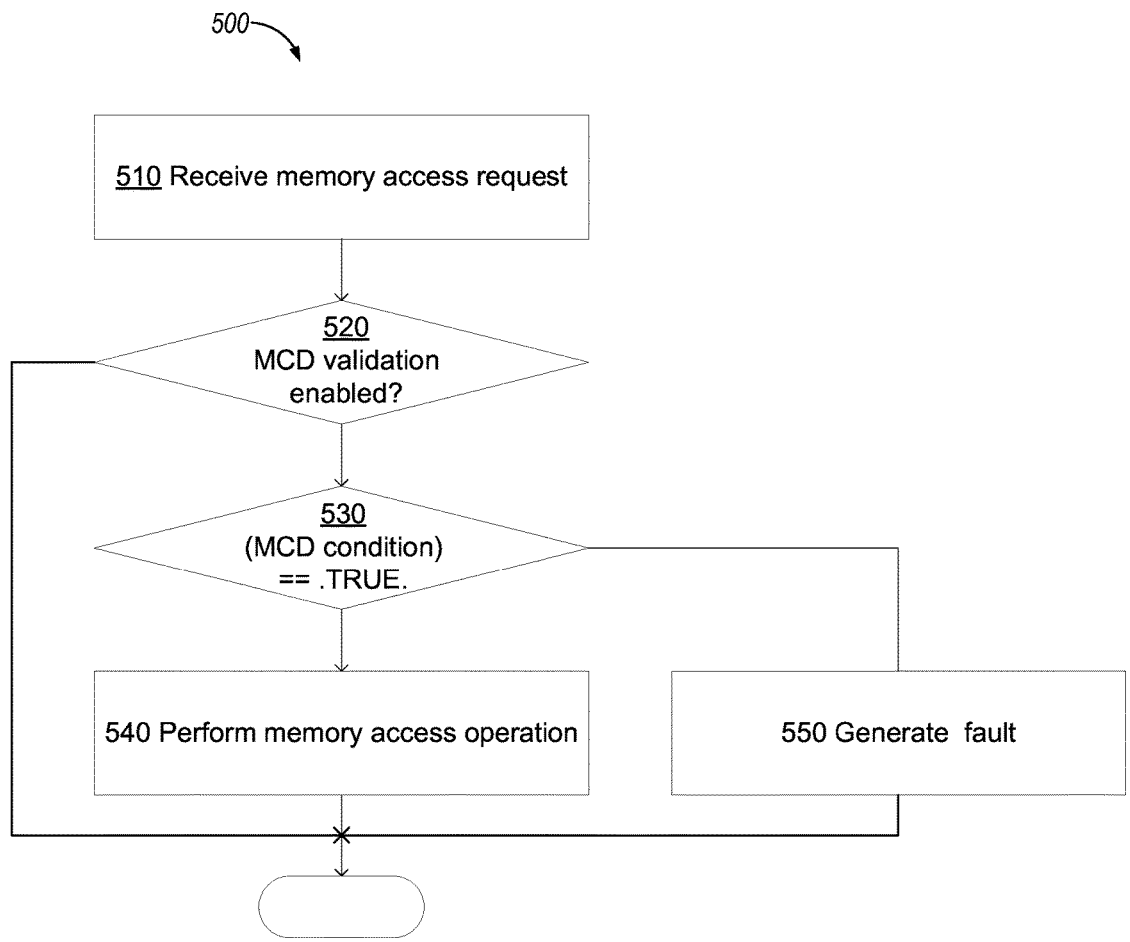
FIG. 5 depicts a flow diagram of an example method for validating a pointer referenced by a memory access instruction, in accordance with one or more aspects of the present disclosure.

FIG. 5 depicts a flow diagram of an example method for validating a pointer referenced by a memory access instruction, in accordance with one or more aspects of the present disclosure. Method 500 may be performed by a computer system that may comprise hardware (e.g., circuitry, dedicated logic, and/or programmable logic), software (e.g., instructions executable on a computer system to perform hardware simulation), or a combination thereof. Method 500 and/or each of its functions, routines, subroutines, or operations may be performed by one or more physical processors of the computer system executing the method. Two or more functions, routines, subroutines, or operations of method 500 may be performed in parallel or in an order which may differ from the order described above. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In one example, as illustrated by FIG. 5, method 500 may be performed by the processing systems described herein below and illustrated by FIGS. 5-11.

Responsive to receiving, at block 510, a memory access request, the processing device implementing the method may proceed to block 520.

Responsive to determining, at block 520, that MCD validation should be performed with respect to the pointer referenced by the memory allocation request, the processing may continue at block 530; otherwise, the method may branch to block 540.

The processing system may be configured to evaluate one or more conditions in order to determine whether MCD validation should be performed with respect to a pointer. In certain implementations, the processing system may determine whether the MCD validation is enabled for the current application by, for example, inspecting the value of the MCD table pointer. Should the MCD table pointer contain a valid address, the MCD validation for the application is presumed to be enabled. Otherwise (e.g., if the MCD table pointer contains a zero address), the MCD validation for the application is presumed to be disabled.

In certain implementations, the processing system may further determine whether the requested memory access operation references a pointer to a user memory page. If so, the MCD validation of the pointer is presumed to be enabled. Otherwise (e.g., if the pointer references a privileged page), the MCD validation of the pointer is presumed to be disabled or may be performed using a separate MCD table (e.g., an optional supervisor/OS MCD table).

In certain implementations, the processing system may further determine whether the memory page that is being accessed is marked for MCD validation in the page table (PT). In an illustrative example, memory pages may be marked for MCD validation by a protection key (PK) referenced by the corresponding page table entry (PTE). Page marking for MCD validation may be performed as a performance optimization measure, and may be enabled or disabled by the operating system (e.g., by setting or clearing a pre-defined CR4 bit).

In certain implementations, the processing system may further determine whether the pointer is in the canonical form (e.g., whether bits 57 . . . 63 are all copies of bit 56). Responsive to determining that the pointer is in the canonical form, MCD validation of the pointer may be omitted; otherwise, MCD validation of the pointer may be performed.

At block 530, the processing system may perform MCD validation of the pointer, by comparing the MCD identifier value retrieved from the MCD table to the MCD identifier value extracted from the pointer specified by the memory access instruction.

In an illustrative example, MCD validation operation may be defined as evaluating the following condition:

ptr[62 . . . 57] XOR 6{ptr[56]}=MCD_Table_Ptr[ptr [56 . . . 6]]&0×3F, wherein:

ptr[62:57] denotes bits 57 . . . 62 of the pointer to the memory buffer being allocated;

6{ptr[56]} denotes 6 bits having the value of bit 56 of the pointer;

MCD_Table_Ptr[ptr[56 . . . 6]]&0×3F denotes 6 lower bits of the MCD identifier value stored, at the offset specified by bits 56 . . 6 of the pointer referenced by the memory access instruction, with respect to the MCD table base address found in MCD_Table_Ptr; and XOR denotes the logical operation of exclusive disjunction Should the MCD condition be evaluated as true, the memory access operation may proceed at block 540, and the method may terminate; otherwise a fault may be generated at block 550, and the method may terminate.

The systems and methods described herein perform memory corruption detection. Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices that may also benefit from better energy efficiency and energy conservation. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods. Power savings realized by systems and methods described herein may be independent of and complementary to an operating system (OS)-based mechanism, such as the Advanced Configuration and Platform Interface (ACPI) standard.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Presented below is a more detailed description of example processing systems that may implement one or more systems of methods for memory corruption detection in accordance with one or more aspects of the present disclosure.

Referring now to FIG. 1, processor 102 may include a Level 1 (L1) internal cache memory 104. Depending on the architecture, processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in processor 102. Processor 102, in certain implementations, includes a microcode ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate implementations of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by processor 102.

A system logic chip 116 is coupled to the processor bus 110 and memory 120. The system logic chip 116 in the illustrated embodiment is a memory controller hub (MCH). Processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

Figure 6:
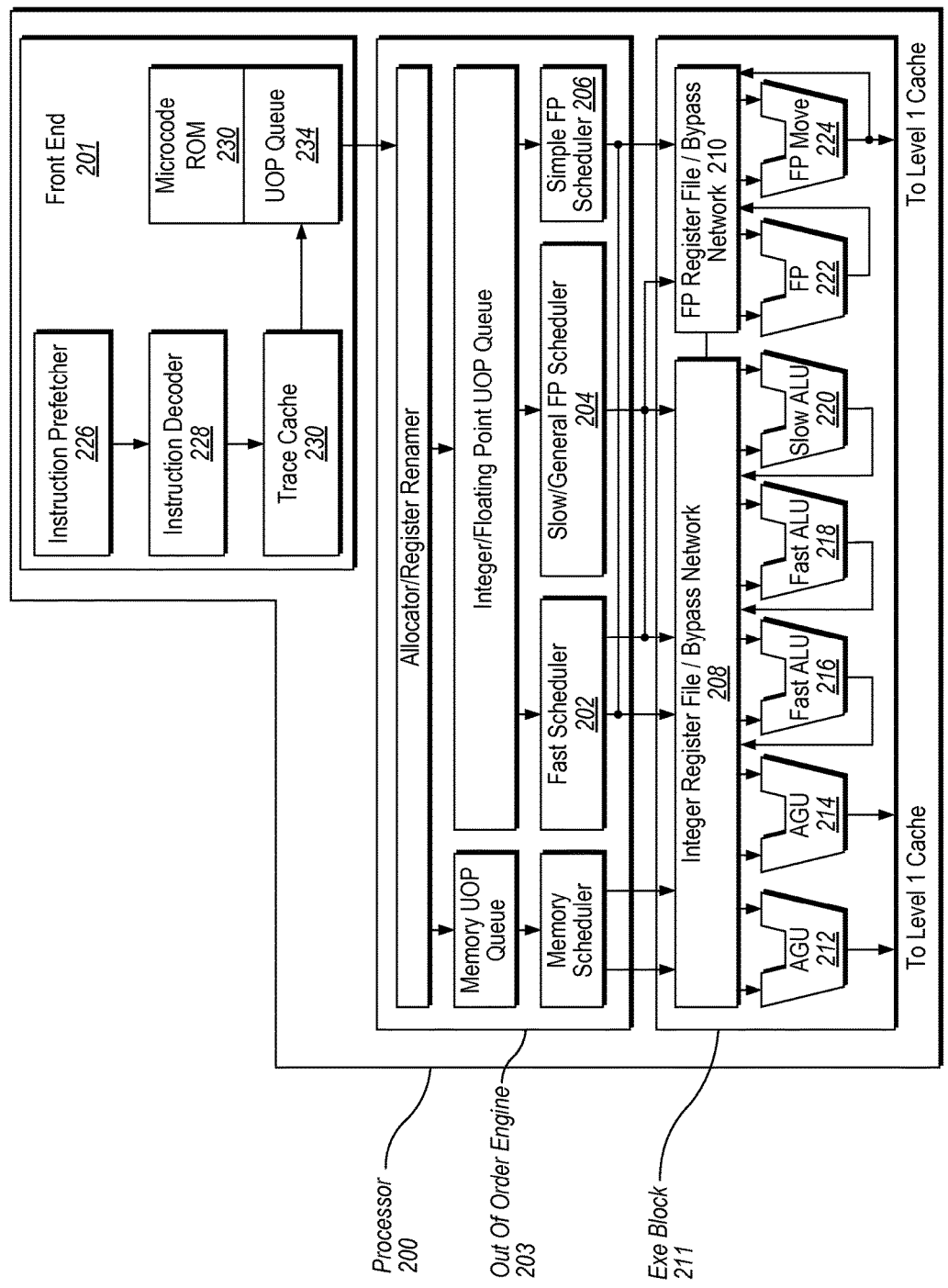
FIG. 6 depicts a block diagram of a processor, in accordance with one or more aspects of the present disclosure.
Figure 7:
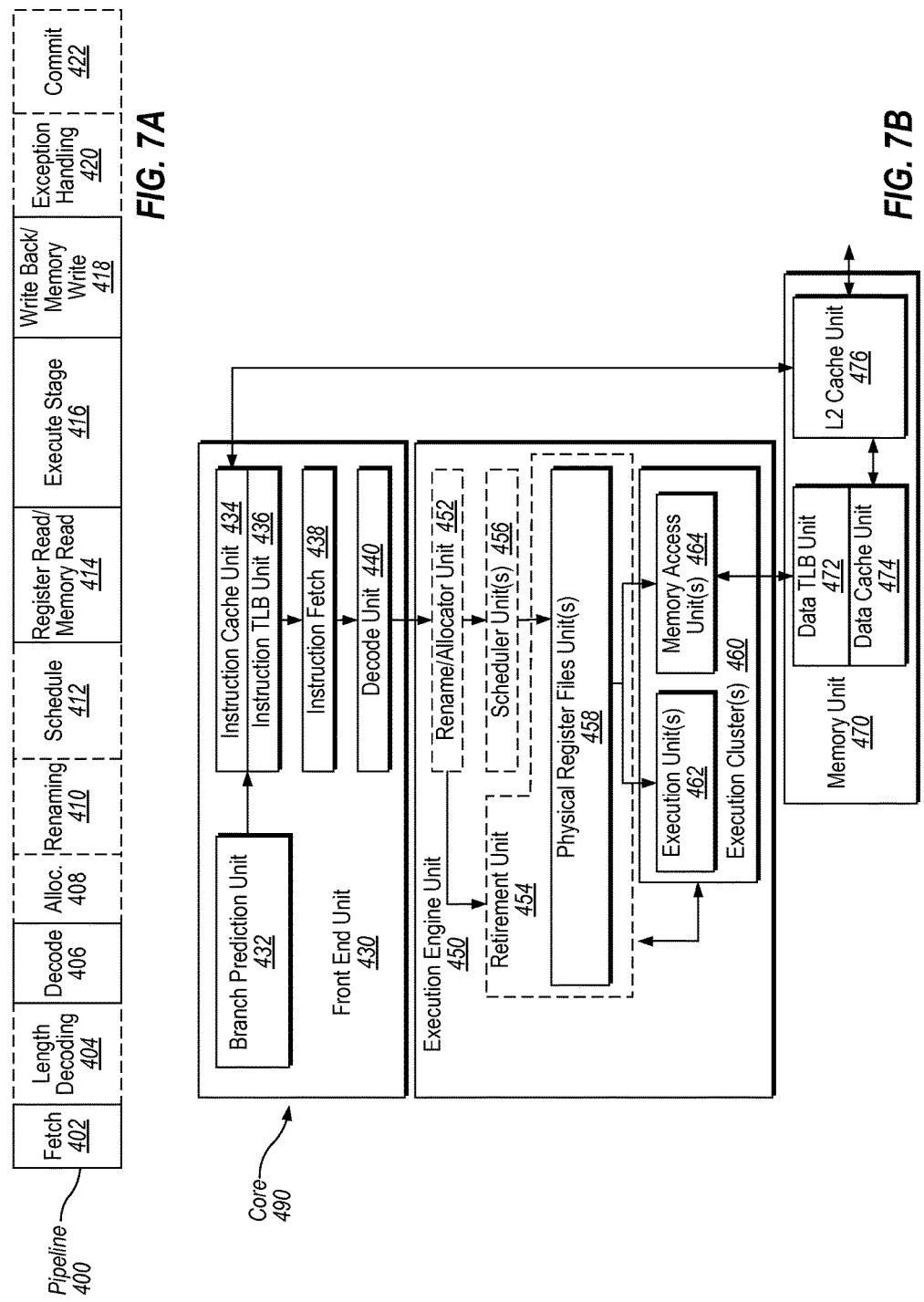
FIGS. 7a-7b schematically illustrate elements of a processor micro-architecture, in accordance with one or more aspects of the present disclosure.

FIG. 6 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in certain implementations, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

FIGS. 7a-7b schematically illustrate elements of a processor micro-architecture, in accordance with one or more aspects of the present disclosure. In FIG. 7a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 7b, arrows denote a coupling between two or more units and the direction of the arrow indicates a direction of data flow between those units. FIG. 7b shows processor core 102 including a front end unit 430 coupled to an execution engine unit 450, and both are coupled to a memory unit 470.

The core 111 may be a reduced instruction set computing (RISC) core, a complex instruction set computing (CISC) core, a very long instruction word (VLIW) core, or a hybrid or alternative core type. As yet another option, the core 111 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 111 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 111 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 8:
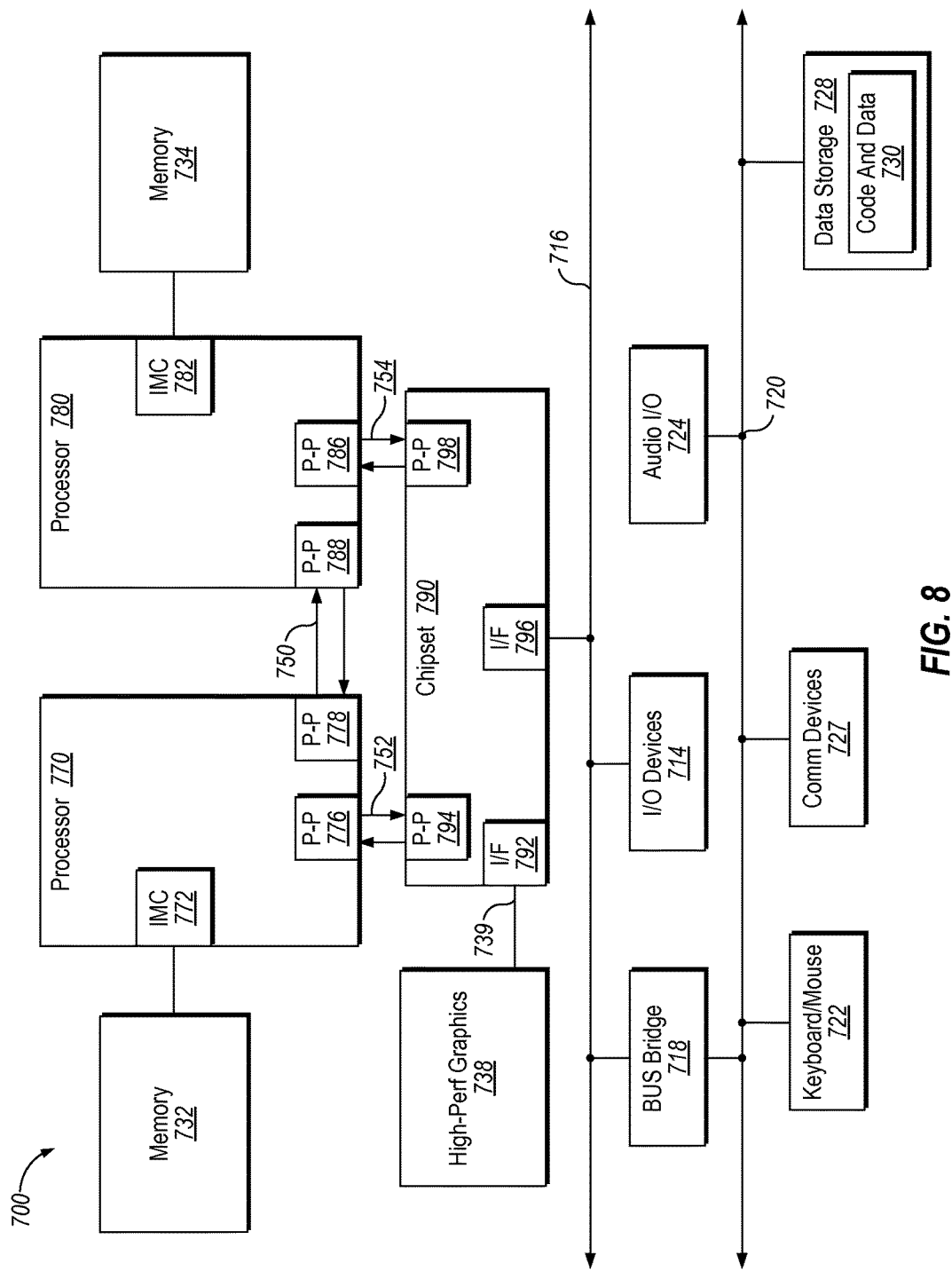
FIG. 8 depicts a block diagram of an example computer system, in accordance with one or more aspects of the present disclosure.

FIG. 8 depicts a block diagram of an example computer system 700, in accordance with one or more aspects of the present disclosure. As shown in FIG. 8, multiprocessor system 700 is a point-to-point interconnect system, and includes a first processor 770 and a second processor 780 coupled via a point-to-point interconnect 750. Each of processors 770 and 780 may be some version of processing system 100 capable of implementing virtual machine-based protected video paths, as described in more details herein above. While shown with only two processors 770, 780, it is to be understood that the scope of the present disclosure is not so limited. In other embodiments, one or more additional processors may be present in the example computer system.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 8, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 8, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720.

Figure 9:
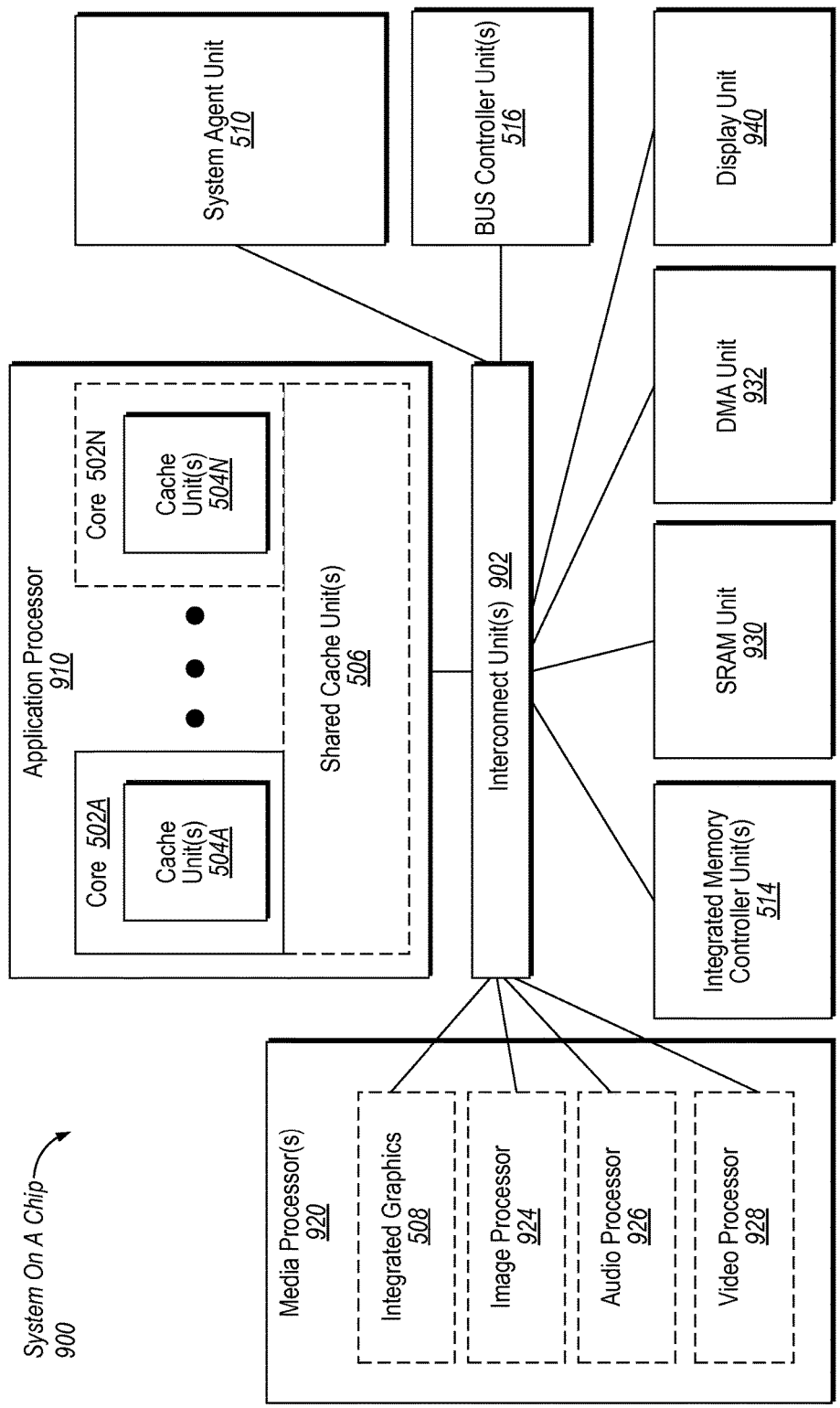
FIG. 9 depicts a block diagram of an example system on a chip (SoC), in accordance with one or more aspects of the present disclosure.

FIG. 9 depicts a block diagram of an example system on a chip (SoC) 900, in accordance with one or more aspects of the present disclosure. The application processor 910 provided by some version of processing system 100 capable of implementing virtual machine-based protected video paths, as described in more details herein above. As schematically illustrated by FIG. 9, interconnect unit(s) 902 may be coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
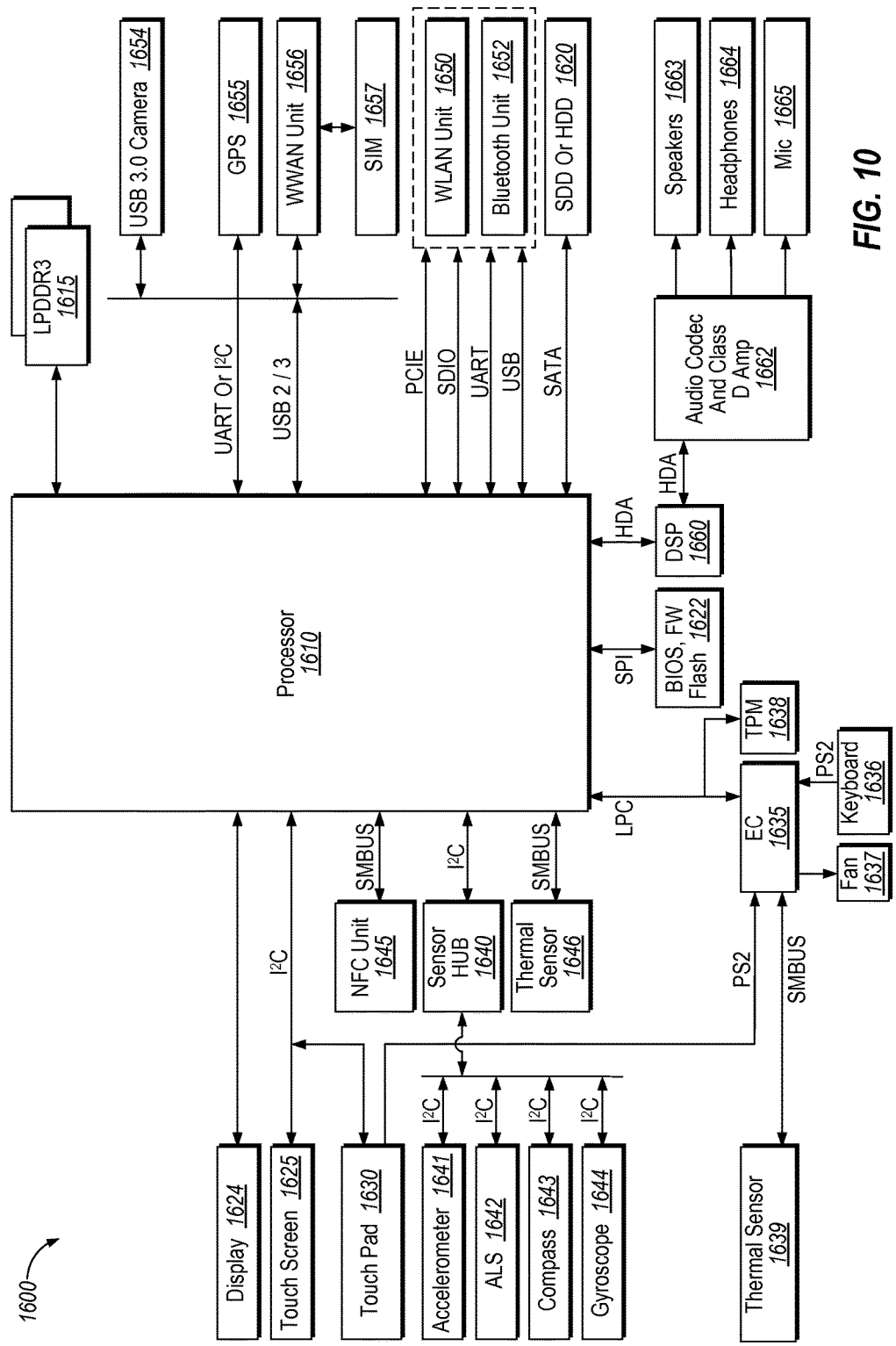
FIG. 10 depicts a block diagram of an example computer system, in accordance with one or more aspects of the present disclosure.

FIG. 10 depicts a block diagram of an example computer system, in accordance with one or more aspects of the present disclosure. Processor 1610 may be provided by some version of processing system 100 capable of implementing virtual machine-based protected video paths, as described in more details herein above.

The system 1600 schematically illustrated by FIG. 10 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 10 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel®

Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 10, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an I2C interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus.

Additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 11:
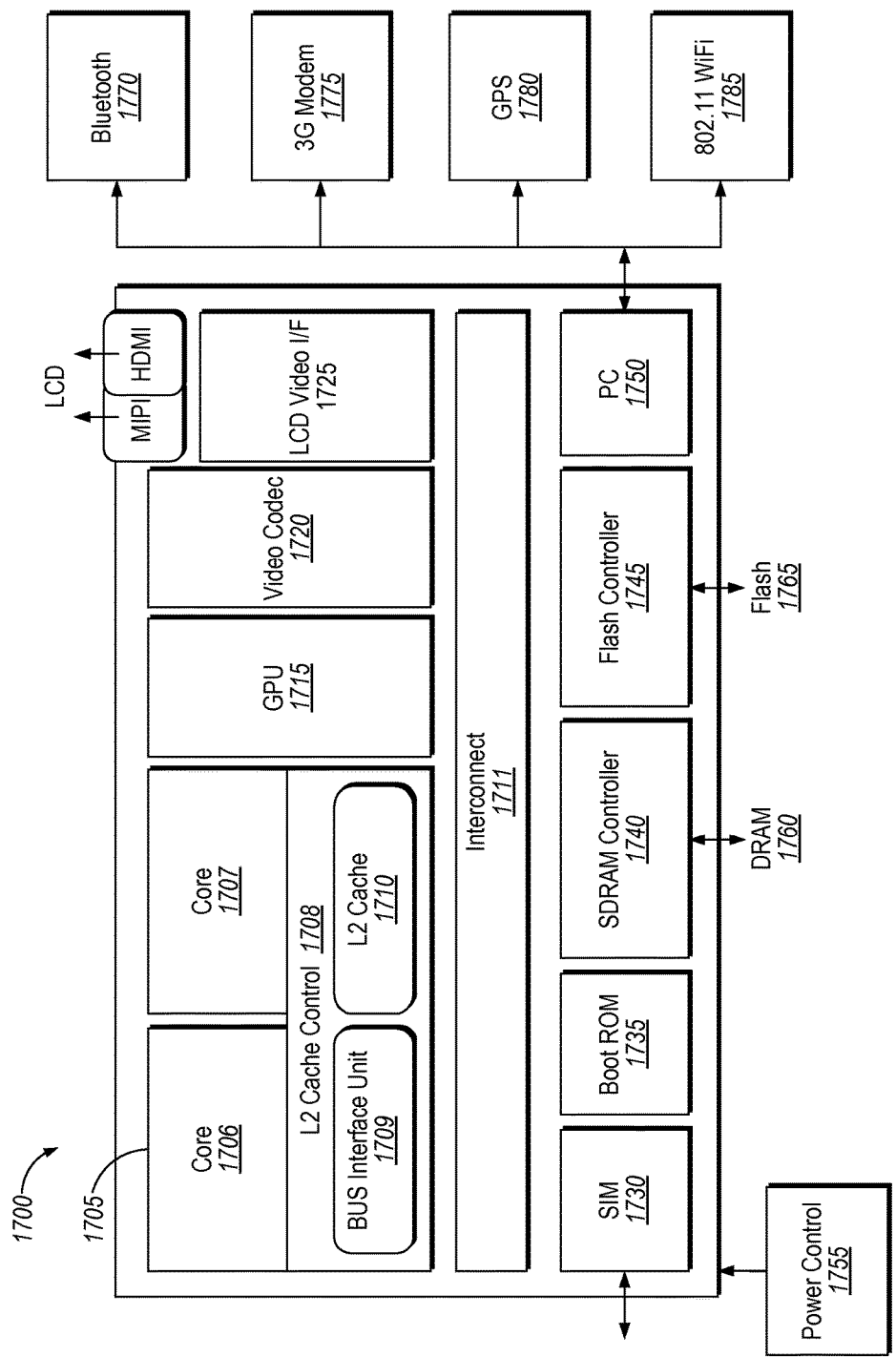
FIG. 11 depicts a block diagram of an example system on a chip (SoC), in accordance with one or more aspects of the present disclosure.

FIG. 11 depicts a block diagram of an example system on a chip (SoC), in accordance with one or more aspects of the present disclosure. As a specific illustrative example, SOC 1700 may be included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 11, SOC 1700 may include two cores. Cores 1706 and 1707 may be coupled to cache control 1708 that is associated with bus interface unit 1709 and L2 cache 1710 to communicate with other parts of system 1700.

Interconnect 1710 may include an on-chip interconnect, such as an IOSF, AMBA, or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1550 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth module 1770, 3G modem 1775, GPS 1785, and WiFi 1785.

Other computer system designs and configurations may also be suitable to implement the systems and methods described herein. The following examples illustrate various implementations in accordance with one or more aspects of the present disclosure.

Example 1 is a processing system, comprising: a processing core including a register to store a base address of a memory corruption detection (MCD) table; wherein the processing core is configured to validate a pointer referenced by a memory access instruction, by comparing a first value derived from a first portion of the pointer to a second value stored in the MCD table at an offset referenced by a second portion of the pointer.

Example 2 is the processing system of Example 1, wherein the first portion of the pointer comprises a pre-defined number of upper bits of the pointer.

Example 3 is the processing system of any of Examples 1-2, wherein the processing core is further configured to determine the offset by shifting the second portion of the pointer to the right by a pre-defined number of bit positions.

Example 4 is the processing system of any of Examples 1-3, wherein the second portion of the pointer comprises a pre-defined number of lower bits of the pointer.

Example 5 is the processing system of any of Examples 1-4, wherein the processing core is further configured to produce the first value by applying an exclusive disjunction operation to the first portion of the pointer and a third value having each bit equal to an upper bit of the first portion of the pointer.

Example 6 is the processing system of any of Examples 1-5, wherein the processing core is further configured to omit pointer validation responsive to determining that the pointer is represented by a canonical form pointer.

Example 7 is the processing system of any of Examples 1-6, wherein the processing core is further configured to generate a fault responsive to failing to validate the pointer.

Example 8 is the processing system of any of Examples 1-7, wherein the processing core is further configured, responsive to receiving an MCD table initialization request from the application, to allocate a memory for storing the MCD table.

Example 9 is the processing system of any of Examples 1-8, wherein the processing core is further configured, responsive to receiving a memory allocation request: allocate a memory buffer; generate an MCD value to be assigned to the memory buffer; initialize, using the MCD value, one or more MCD table entries corresponding to one or more memory blocks comprised by the memory buffer; and store a bit sequence derived from the MCD value within pre-defined bit positions of a pointer referencing the memory buffer.

Example 10 is the processing system of any of Examples 1-9, wherein the processing system comprises a system-on-chip (SoC).

Example 11 is a method, comprising: storing, in a register of a processing core, a base address of a memory corruption detection (MCD) table associated with an application being executed by the processing core; and validating, by the processing core, a pointer produced by a memory access instruction of the application, by comparing a first value derived from a first portion of the pointer to a second value stored in the MCD table at an offset referenced by a second portion of the pointer.

Example 12 is the method of Example 11, wherein the first portion of the pointer comprises a pre-defined number of upper bits of the pointer.

Example 13 is the method of any of Examples 11-12, wherein the validating further comprises: determining the offset by shifting the second portion of the pointer to the right by a pre-defined number of bit positions.

Example 14 is the method of any of Examples 11-13, wherein the second portion of the pointer comprises a pre-defined number of lower bits of the pointer.

Example 15 is the method of any of Examples 11-14, wherein the validating further comprises: producing the first value by applying an exclusive disjunction operation to the first portion of the pointer and a third value having each bit equal to an upper bit of the first portion of the pointer.

Example 16 is the method of any of Examples 11-15, wherein the validating further comprises: determining that the pointer is not represented by a canonical form pointer.

Example 17 is the method of any of Examples 11-16, further comprising: generating a fault responsive to failing to validate the pointer.

Example 18 is the method of any of Examples 11-17, further comprising: responsive to receiving an MCD table initialization request, allocating a memory for storing the MCD table.

Example 19 is the method of any of Examples 11-18, further comprising: responsive to receiving a memory allocation request, allocating a memory buffer; generating an MCD value to be assigned to the memory buffer; initializing, using the MCD value, one or more MCD table entries corresponding to one or more memory blocks comprised by the memory buffer; and storing a bit sequence derived from the MCD value within pre-defined bit positions of a pointer referencing the memory buffer.

Example 20 is a computer-readable non-transitory storage medium comprising executable instructions that, when executed by a processor, cause the processor to: responsive to receiving a memory allocation request, allocate a memory buffer; generate an MCD value to be assigned to the memory buffer; initialize, using the MCD value, one or more MCD table entries corresponding to one or more memory blocks comprised by the memory buffer; and store a bit sequence derived from the MCD value within pre-defined bit positions of a pointer referencing the memory buffer.

Example 21 is the computer-readable non-transitory storage medium of Example 20 further comprising executable instructions causing the processor to: store, in a register of a processing core, a base address of the memory corruption detection (MCD) table associated with an application being executed by the processing core.

Example 22 is the computer-readable non-transitory storage medium of any of Examples 20-21 further comprising executable instructions causing the processor to: validate a pointer produced by a memory access instruction of the application, by comparing a first value derived from a first portion of the pointer to a second value stored in the MCD table at an offset referenced by a second portion of the pointer.

Example 23 is the computer-readable non-transitory storage medium of Example 22, wherein the validating further comprises: determining the offset by shifting the second portion of the pointer to the right by a pre-defined number of bit positions.

Example 24 is the computer-readable non-transitory storage medium of any of Examples 22-23, wherein the validating further comprises: producing the first value by applying an exclusive disjunction operation to the first portion of the pointer and a third value having each bit equal to an upper bit of the first portion of the pointer.

Example 25 is the computer-readable non-transitory storage medium of any of Examples 22-24, wherein the validating further comprises: determining that the pointer is not represented by a canonical form pointer.

Example 26 is the computer-readable non-transitory storage medium of any of Examples 22-25, further comprising executable instructions causing the processor to: generate a fault responsive to failing to validate the pointer.

Example 27 is an apparatus comprising: a memory; and a processing system coupled to the memory, the processing system to perform the method of any of the Examples 11-19.

Some content portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processing system, comprising:
   a processing core including a register to store a base address of a memory corruption detection (MCD) table; wherein the processing core is to:
   receive a memory access instruction referencing a pointer to a memory buffer;
   compare a first value derived from a first sequence of bits comprising a first pre-defined number of upper bits of the pointer to a second value stored in the MCD table at an offset referenced by a second sequence of bits comprising a second pre-defined number of lower bits of the pointer; and
   responsive to ascertaining that the first value matches the second value, cause the memory access instruction to be executed.

2. The processing system of claim 1, wherein the processing core is further configured to determine the offset by shifting the second sequence of bits of the pointer to the right by a pre-defined number of bit positions.

3. The processing system of claim 1, wherein the processing core is further configured to produce the first value by applying an exclusive disjunction operation to the first sequence of bits of the pointer and a third value having each bit equal to an upper bit of the first sequence of bits of the pointer.

4. The processing system of claim 1, wherein the processing core is further configured to omit pointer validation responsive to determining that the pointer is represented by a canonical form pointer.

5. The processing system of claim 1, wherein the processing core is further to generate a fault responsive to determining that the first value does not match the second value.

6. The processing system of claim 1, wherein the processing core, responsive to receiving an MCD table initialization request from an application, is further to allocate a memory for storing the MCD table.

7. The processing system of claim 1, wherein the processing core, responsive to receiving a memory allocation request, is further to:
   allocate a memory buffer;
   generate an MCD value to be assigned to the memory buffer;
   initialize, using the MCD value, one or more MCD table entries corresponding to one or more memory blocks comprised by the memory buffer;
   produce, using the MCD value, the first sequence of bits; and
   store the first sequence of bits derived within pre-defined bit positions of the pointer.

8. The processing system of claim 1, wherein the processing system comprises a system-on-chip (SoC).

9. A method, comprising:
   storing, in a register of a processing core, a base address of a memory corruption detection (MCD) table associated with an application being executed by the processing core;
   receiving, by the processing core, a memory access instruction referencing a pointer;
   comparing a first value derived from a first sequence of bits comprising a first pre-defined number of upper bits of the pointer to a second value stored in the MCD table at an offset referenced by a second sequence of bits comprising a second pre-defined number of lower bits of the pointer; and
   responsive to ascertaining that the first value matches the second value, causing the memory access instruction to be executed.

10. The method of claim 9, wherein the validating further comprises:
    determining the offset by shifting the second sequence of bits of the pointer to the right by a pre-defined number of bit positions.

11. The method of claim 9, wherein the validating further comprises:
    producing the first value by applying an exclusive disjunction operation to the first sequence of bits of the pointer and a third value having each bit equal to an upper bit of the first sequence of bits of the pointer.

12. The method of claim 9, wherein the validating further comprises:
    determining that the pointer is not represented by a canonical form pointer.

13. The method of claim 9, further comprising:
    generating a fault responsive to determining that the first value does not match the second value.

14. The method of claim 9, further comprising:
    responsive to receiving an MCD table initialization request, allocating a memory for storing the MCD table.

15. The method of claim 9, further comprising:
responsive to receiving a memory allocation request, allocating a memory buffer;
generating an MCD value to be assigned to the memory buffer;
initializing, using the MCD value, one or more MCD table entries corresponding to one or more memory blocks comprised by the memory buffer;
producing, using the MCD value, the first sequence of bits; and
storing the first sequence of bits derived within pre-defined bit positions of the pointer.

16. A computer-readable non-transitory storage medium comprising executable instructions that, when executed by a processor, cause the processor to:
responsive to receiving a memory allocation request, allocate a memory buffer;
generate a memory corruption detection (MCD) value to be assigned to the memory buffer;
initialize, using the MCD value, an MCD table entry identified by an offset referenced by a first sequence of bits comprising a first pre-defined number of lower bits of an address of the memory buffer;
produce, using the MCD value, a second sequence of bits; and
store the second sequence of bits derived from the MCD value within a second pre-defined number of upper bits of a pointer referencing the memory buffer.

* * * * *